United States Patent
Park et al.

(10) Patent No.: US 9,791,293 B2
(45) Date of Patent: Oct. 17, 2017

(54) DETACHABLE NAVIGATION SYSTEM

(71) Applicant: ENGIS TECHNOLOGIES, INC., Seoul (KR)

(72) Inventors: Yong Sun Park, Seoul (KR); Min Su Lee, Seoul (KR)

(73) Assignee: ENGIS TECHNOLOGIES, INC., Seoul (KR)

(*) Notice: Subject to any disclaimer, the term of this patent is extended or adjusted under 35 U.S.C. 154(b) by 0 days.

(21) Appl. No.: 14/364,403

(22) PCT Filed: Jun. 13, 2013

(86) PCT No.: PCT/KR2013/005222
§ 371 (c)(1),
(2) Date: Jun. 11, 2014

(87) PCT Pub. No.: WO2014/007473
PCT Pub. Date: Jan. 9, 2014

(65) Prior Publication Data
US 2014/0350833 A1    Nov. 27, 2014

(30) Foreign Application Priority Data

Jul. 3, 2012 (KR) .................. 10-2012-0072126

(51) Int. Cl.
| G06F 7/70 | (2006.01) |
| G06F 19/00 | (2011.01) |
| G06G 7/00 | (2006.01) |
| G06G 7/76 | (2006.01) |
| G01C 21/36 | (2006.01) |
| H04W 4/02 | (2009.01) |
| H04W 88/02 | (2009.01) |

(52) U.S. Cl.
CPC .......... *G01C 21/3688* (2013.01); *H04W 4/02* (2013.01); *H04W 88/02* (2013.01)

(58) Field of Classification Search
CPC ............................ H04W 4/02; G01C 21/3688
USPC ........................................... 701/123
See application file for complete search history.

(56) References Cited

U.S. PATENT DOCUMENTS

| 2006/0223518 A1* | 10/2006 | Haney | H04W 12/08 455/420 |
| 2013/0007063 A1* | 1/2013 | Kalra | G06F 17/30893 707/796 |
| 2013/0226443 A1* | 8/2013 | Scofield | B60R 16/0232 701/123 |
| 2013/0238165 A1* | 9/2013 | Garrett | G06F 9/4443 701/2 |

FOREIGN PATENT DOCUMENTS

| JP | 2008039682 A * | 2/2008 |
| JP | 2010-257321 | 11/2010 |
| JP | 2012-18587 | 1/2012 |
| KR | 10-2009-0030797 | 3/2009 |
| KR | 10-2011-0096638 | 8/2011 |

(Continued)

Primary Examiner — Maceeh Anwari
(74) Attorney, Agent, or Firm — Sughrue Mion, PLLC

(57) ABSTRACT

A car navigation system is disclosed. The disclosed car navigation system performs a route search, map storage, and the like by using a mobile device and displays a performance result by transmitting the performance result to a display device equipped in a vehicle.

6 Claims, 5 Drawing Sheets

(56) References Cited

FOREIGN PATENT DOCUMENTS

| | | |
|---|---|---|
| KR | 10-1103231 | 1/2012 |
| KR | 10-2012-0033607 A | 4/2012 |
| WO | WO-2012/138201 | 10/2012 |

* cited by examiner

DETACHABLE NAVIGATION SYSTEM

The present invention relates to a navigation system of a vehicle, and more particularly, to a detachable navigation system including a mobile device and a display device configured to receive location information and search information from the mobile device and to display the received location information and search information.

BACKGROUND ART

In general, a car navigation system (CNS) refers to a driving guide system or a driving guidance system that guides a vehicle to a destination accurately by providing location information to the vehicle while driving.

The car navigation system may display a current location and a heading direction of a vehicle to a driving customer through a screen equipped in the vehicle, based on data received from a global position system (GPS) satellite. Also, in a case in which a user is to visit a region unfamiliar with the user, the car navigation system may display the roads, an estimated distance, an estimated time, and the like on the screen in response to a departure and a destination input from the user.

For example, in a case in which a user is to drive a vehicle using an existing car navigation system and in this instance, is aware of an accurate name of a destination, for example, JONGRO dental clinic, the user may input the name of the destination and conducts a search. In response thereto, a search engine of the car navigation may search a database within the car navigation system for an address list corresponding to the destination name, and may display the found address list.

SUMMARY OF THE INVENTION

Embodiments provide a car navigation system using a mobile device.

Embodiments also provide a car navigation system that does not need a low specification central processing unit (CPU) and a global position system (OPS) receiving module, while not requiring a mass storage device.

According to an exemplary embodiment, there is provided a mobile device including: a location calculator configured to calculate a location of the mobile device; and a display communication unit configured to transmit the calculated location of the mobile device to a display device. The transmitted location of the mobile device may be mapped on the map stored in the display device and displayed on the display device.

Here, when the calculated location of the mobile device fails in being mapped on the map stored in the display device, the display communication unit may receive an additional map request from the display device, and may transmit a map corresponding to the calculated location of the mobile device in response to the additional map request.

The location calculator may calculate the location of the mobile device based on a global position system (GPS) signal.

Also, the mobile device may further include a communication network connector configured to conduct a search by transmitting, to a search server, a search condition received from the display device. The display communication unit may transmit a search result to the display device.

Here, the search condition may be a search condition for a route search including a start location and a destination location or a search condition for a region search for a region including the calculated location of the mobile device.

The mobile device may further include a controller configured to calculate a fuel efficiency or an energy efficiency of a vehicle based on information on the vehicle that is received from the display device. The display communication unit may transmit the fuel efficiency or the energy efficiency of the vehicle to the display device.

Also, the mobile device may further include a communication network connector configured to receive traffic information corresponding to the calculated location of the mobile device from a traffic information providing server over a wireless communication network. The display communication unit may transmit the received traffic information to the display device.

According to another exemplary embodiment, there is provided a display device to be equipped in a vehicle, the display device including: a receiver configured to receive a location of the vehicle from a mobile device; a storage configured to store a map; and a display unit configured to mark and display the location of the vehicle on the map.

Here, the display device may further include a controller configured to determine whether the location of the vehicle is capable of being marked on the map stored in the storage. The receiver may receive an additional map from the mobile device based on a result of the determining, and the display unit may mark and display the location of the vehicle on the additional map.

The display device may further include a controller. The display unit may display an interface for receiving a search condition, the touch input unit may receive a touch input associated with the search condition from a user based on the interface, and the controller may generate the search condition by analyzing the touch input.

Also, the display device may further include a transmitter configured to transmit the search condition to the mobile device. The receiver may receive a search result corresponding to the search condition from the mobile device, and the display unit may display the received search result to the user.

According to still another exemplary embodiment, there is provided an operation method of a mobile device, the method including: calculating a location of a mobile device equipped in a vehicle; and transmitting the calculated location of the mobile device to a display device equipped in the vehicle. The transmitted location of the mobile device may be mapped on a map stored in the display device and displayed on the display device.

Here, the operation method of the mobile device may further include: receiving an additional map request from the display device when the calculated location of the mobile device fails in being mapped on the map stored in the display device; and transmitting a map corresponding to the calculated location of the mobile device in response to the additional map request.

The operation method of the mobile device may further include: conducting a search by transmitting, to a search server, a search condition received from the display device; and transmitting a search result to the display device Also, the search condition may be a search condition for a route search including a start location and a destination location or a search condition for a region search for a region including the calculated location of the mobile device.

Here, the operation method of the mobile device may further include: receiving information on the vehicle from the display device; calculating a fuel efficiency or an energy efficiency of the vehicle based on information on the vehicle;

and transmitting the fuel efficiency or the energy efficiency of the vehicle to the display device.

Here, the operation method of the mobile device may further include: receiving traffic information corresponding to the calculated location of the mobile device from a traffic information providing server over a wireless communication network; and transmitting the received traffic information to the display device.

According to still another exemplary embodiment, there is provided an operation method of a display device equipped in a vehicle, the method including: receiving a location of a vehicle from a mobile device equipped in the vehicle; storing and maintaining a map; and marking and displaying the location of the vehicle on the map.

Here, the operation method of the display device may further include: determining whether the location of the vehicle is capable of being marked on the map stored in the storage; receiving an additional map from the mobile device based on a result of the determining; and marking and displaying the location of the vehicle on the additional map The operation method of the display device may further include: displaying an interface for receiving a search condition; receiving a touch input associated with the search condition from a user based on the interface; and generating the search condition by analyzing the touch input Also, the operation method of the display device may further include: transmitting the search condition to the mobile device; receiving a search result corresponding to the search condition from the mobile device; and displaying the received search result to the user.

According to still another exemplary embodiment, there is provided a detachable navigation system to be equipped in a vehicle, the navigation system comprising: a display device configured to provide a user interface for receiving information on a destination from a user, and to transmit information on the destination to a mobile device; and the mobile device configured to receive information on the destination, to calculate a current location of the mobile device corresponding to a current location of the vehicle, to calculate a route from the current location of the mobile device to the destination, and to transmit, to the display device, information on the calculated current location of the mobile device and information on the route to the destination, wherein the display device is configured to store a map corresponding to a predetermined partial area in a storage instead of storing the entire area covered by a car navigation system, to receive information on the current location of the vehicle from the mobile device, and to map and thereby display information on the current location of the vehicle on the map stored in the storage, and when the current location of the vehicle is deviated from an area of the map stored in the storage, the display device is configured to request the mobile device for a map of an area not stored in the storage and the mobile device is configured to transmit map data corresponding to the current location of the mobile device to the display device.

According to embodiments, there may be provided a car navigation system using a mobile device.

According to embodiments, there may be provided a car navigation system that does not need a low specification central processing unit (CPU) and a global position system (GPS) receiving module, while not requiring a mass storage device.

DETAILED DESCRIPTION OF THE INVENTION

Hereinafter, exemplary embodiments of the present invention are described with reference to the accompanying drawings.

Figure 1:
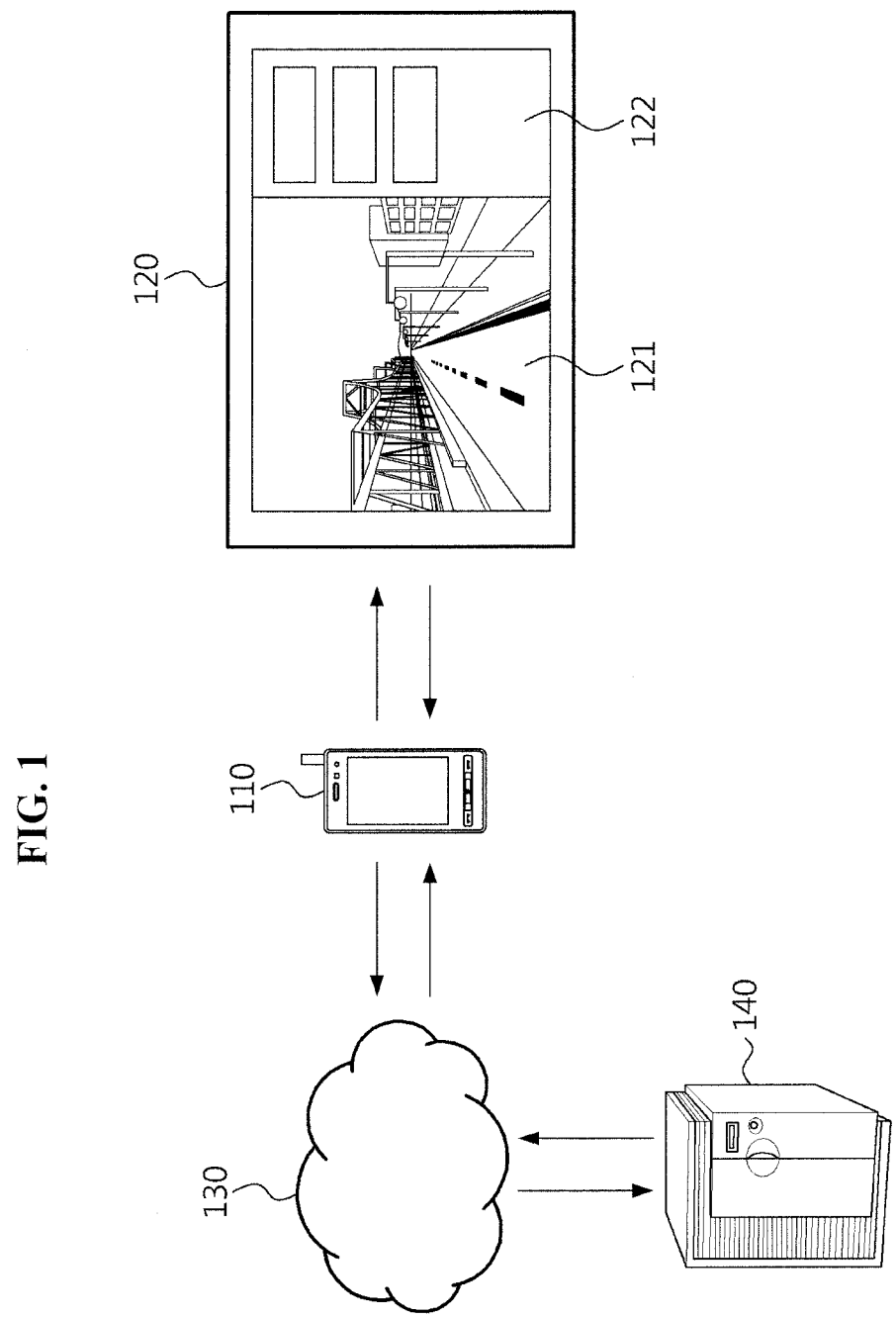
FIG. 1 is a diagram illustrating a car navigation system according to an exemplary embodiment.

FIG. 1 is a diagram illustrating a car navigation system according to an exemplary embodiment.

Referring to FIG. 1, the car navigation system according to the exemplary embodiment includes a smartphone 110 and a display device 120.

The display device 120 displays a navigation screen 121 and a user interface 122 on a screen.

The display device 120 provides the user interface 122 for receiving information on a destination from a user. The display device 120 transmits information on the destination to the smartphone 110. According to an aspect, the display device 120 may transmit information on the destination to the smartphone 110 using at least one of communication methods such as Bluetooth, wireless fidelity (Wi-Fi), universal serial bus (USB).

The smartphone 110 receives information on the destination from the display device 120. The smartphone 110 may include a mass storage device, such as an external storage, and may store a map in the mass storage device. According to an aspect, the smartphone 110 may calculate a route from a current location to the destination, based on the map stored in the mass storage device.

According to another aspect, the smartphone 110 may transmit information on the destination to a server 140 using a communication network 130. In this example, the smartphone 110 may transmit information on the destination using, for example, a wideband code division multiple access (WCDMA) communication network and a long term evolution (LTE) communication network. The smartphone 110 may receive information on the route to the destination from the server 140, and may transmit the received information on the route to the display device 120.

The display device 120 may receive information on the route from the smartphone 110, and may display the received information on the route on the navigation screen 121.

According to the embodiment of FIG. 1, the display device 120 provides the basic user interface 120 for, for example, receiving information on a destination from a user, and displays a found route on the navigation screen 121. Also, the smartphone 110 performs functionalities, for example, map storing, map search, and connection to a wireless network. Accordingly, the display device 120 may not need to include a high performance central processing unit (CPU) and a mass memory to conduct a map search.

Thus, according to the embodiment of FIG. 1, the display device 120 may be produced at further inexpensive cost and a user may utilize a further enhanced service at relatively low cost.

Figure 2:
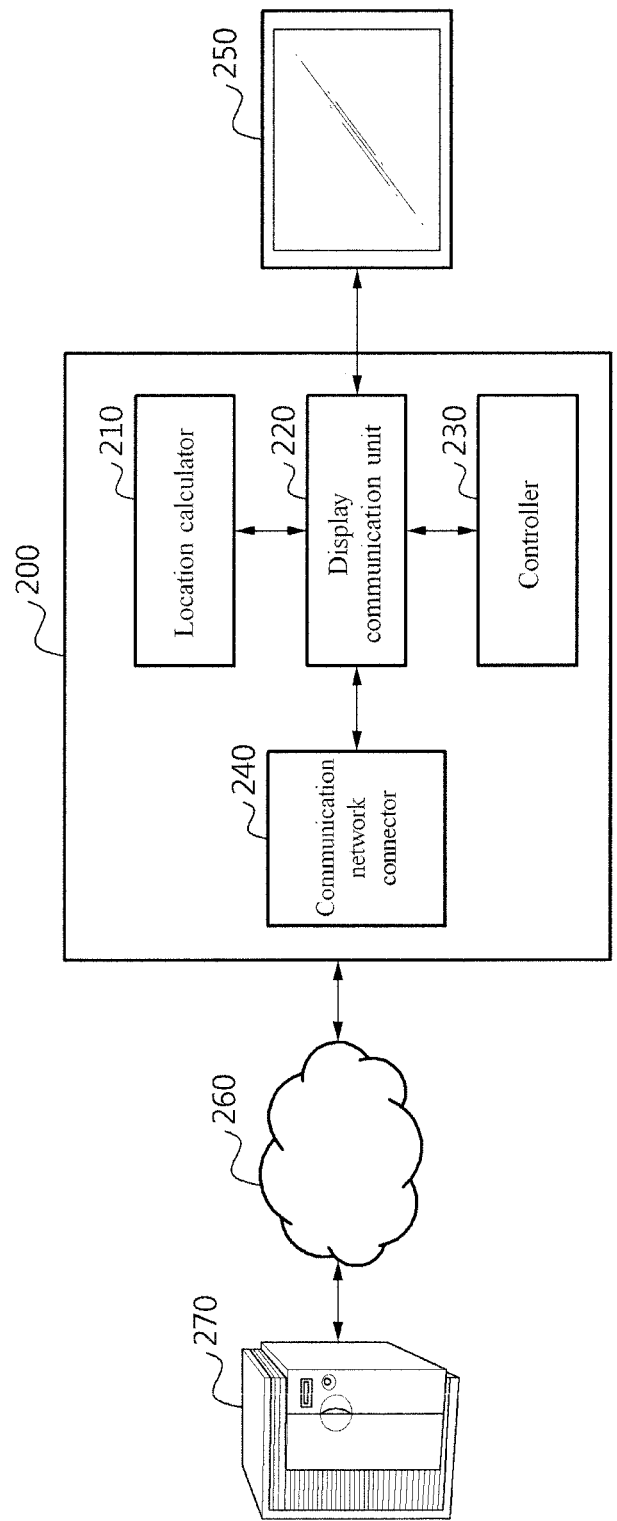
FIG. 2 is a block diagram illustrating a configuration of a mobile device according to an exemplary embodiment.

FIG. 2 is a block diagram illustrating a configuration of a mobile device according to an exemplary embodiment.

A mobile device 200 of FIG. 2 includes a location calculator 210, a display communication unit 220, a controller 230, and a communication network connector 240.

The location calculator 210 calculates a location of the smartphone 200. When the smartphone is equipped in a vehicle together with a display device 250, the location of the smartphone 200 calculated by the location calculator 210 may be used as a location of the display device 250 and a location of the vehicle. Hereinafter, herein, the location of the smartphone 200 is assumed to be the same as the location of the display device 250 and the location of the vehicle. According to an aspect, the location calculator 210 may receive a GPS signal, and may calculate the location of the smartphone 200 based on the received GPS signal.

The display communication unit 220 transmits the location of the smartphone 200 calculated by the location calculator 210 to the display device 250. According to an aspect, the transmitted location of the smartphone 200 may be mapped on a map stored in the display device 250 and be displayed thereon.

According to an aspect, the display device 250 receives the location of the smartphone 200 from the display communication unit 220, and maps and thereby marks the received location of the smartphone 200 on the map stored in the display device 250. According to an aspect, instead of including a mass storage device configured to store a map of the entire area covered by a car navigation system, the display device 250 may include only a small capacity buffer memory configured to display only a small area map enough to be displayed on a screen of the display device 250.

In this example, when the vehicle moves and is deviated from an area of a map stored in the buffer memory, the display device 250 may not map the location of the smartphone 200 on the map.

In this example, the display communication unit 220 may receive, from the display device 250, an additional map request for requesting a map of an area not stored in the buffer memory of the display device 250.

According to an aspect, the smartphone 200 may include a mass storage device configured to store a map of the entire area covered by a car navigation system. In this example, the display communication unit 220 may search the mass storage device for a map corresponding to the location of the smartphone 200 and may transmit the found map to the display device 250.

According to another aspect, the smartphone 200 may not include a map corresponding to the location of the smartphone 200. In this example, the communication network connector 240 may transmit an additional map request to a server 270 over a wireless communication network 260. The communication network connector 240 may receive the map corresponding to the location of the smartphone 200 over the wireless communication network 260. The display communication unit 220 may transmit the map corresponding to the location of the smartphone 200 to the display device 250.

According to an aspect, the display communication unit 220 may communicate with the display device 250 using at least one of communication methods such as Bluetooth communication, Wi-Fi, and USB.

Also, according to an aspect, the communication network connector 240 may communicate with the server 270 using a WCDMA communication network and an LTE network.

According to an aspect, the display communication unit 220 may receive a search condition from the display device 250. Here, the search condition may be a search condition for a route search including a start location and a destination location, or a search condition fix a region search for a region including the location of the smartphone 200.

In this example, the communication network connector 240 may conduct a search by transmitting, to a search server, the search condition received from the display device 250. The display communication unit 220 may transmit a search result to the display device 250.

For example, the display communication unit 220 may receive, from the display device 250, a search condition for a route search including a start location and a destination location, and the communication network connector 240 may transmit the search condition to the server 270. The communication network connector 240 may receive, from the server 270, information on an optimal route considering traffic information and the display communication unit 220 may transmit information on the optimal route to the display device 250.

According to another aspect, the display communication unit 220 may receive a search condition for a gas station closet to a current location of the smartphone 200. The communication network connector 240 may transmit the search condition to the server 270. The communication network connector 240 may receive a search result from the server 270 and the display communication unit 220 may transmit the search result to the display device 250.

Although only an embodiment in which the smartphone 200 transmits the search condition to the server 270 is described, the smartphone 200 may store a map of the entire area covered by a car navigation system, and may directly search for a route using the entire area map or may calculate a region search result about the calculated location. In this example, the smartphone 200 may transmit the search result to the display device 250 using the display communication unit 220, instead of connecting to the server 270 over the wireless communication network 260.

According to an aspect, the communication network connector 240 may receive traffic information from the server 270 over the wireless communication network 260. Here, the traffic information received by the communication network connector 240 may refer to traffic information on the location of the smartphone 200 calculated by the location calculator 210 or the corresponding area. In this example, the display communication unit 220 may transmit the traffic information to the display device 250, and the traffic information may be displayed on the display device 250.

According to an aspect, the display communication unit 220 may receive, from the display device 250, information on the vehicle in which the smartphone 200 is equipped. Here, information on the vehicle may include information on a model and a displacement of the corresponding vehicle. In this example, the controller 230 may calculate a fuel efficiency or energy efficiency of the vehicle based on information on the vehicle. Also, the display communication unit 220 may transmit the calculated fuel efficiency or energy efficiency to the display device 250, and the calculated fuel efficiency or energy efficiency may be displayed on the screen of the display device 250.

According to an aspect, the controller 230 may calculate a speed of the vehicle in which the smartphone 200 is equipped, based on the location of the smartphone 200 calculated by the location calculator 210. When the calculated speed of the vehicle is greater than or equal to a threshold, the display communication unit 220 may transmit function lock setting data to the display device 250. Here, the function lock setting data may include information regarding a unique number of each screen constituting a user interface displayed on the display device 250, a unique number of each of interface elements displayed on each screen, and activation or inactivation thereof. The display device 250 may control a user interface to be activated or inactivated based on the function lock setting data.

Figure 3:
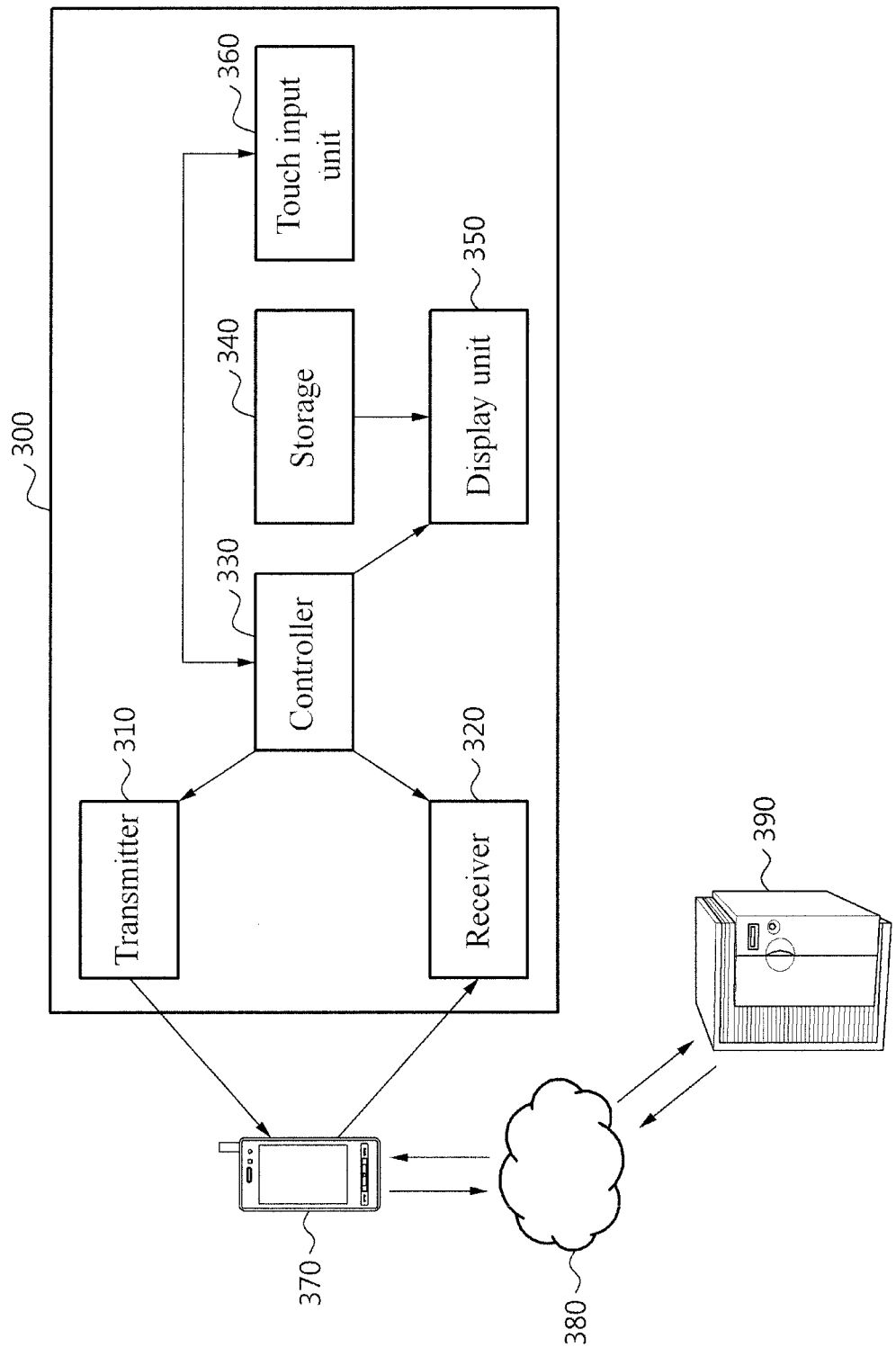
FIG. 3 is a block diagram illustrating a configuration of a display device according to an exemplary embodiment.

FIG. 3 is a block diagram illustrating a configuration of a display device according to an exemplary embodiment.

Referring to FIG. 3, a display device 300 includes a transmitter 310, a receiver 320, a controller 330, a storage 340, a display unit 350, and a touch input unit 360.

The receiver 320 receives, from a smartphone 370, a location of a vehicle in which the display device 300 is equipped.

The storage 340 stores a map. According to an aspect, instead of storing a map of the entire area covered by a car navigation system, the storage 340 may store only a map corresponding to a partial area. In this example, the controller 330 determines whether the received location of the vehicle may be marked on the map stored in the storage 340. When it is determined that the received location of the vehicle cannot be marked on the map stored in the storage 340, the transmitter 310 transmits, to the smartphone 370, an additional map request for requesting a map of an area corresponding to the location of the vehicle. In response to the additional map request, the receiver 320 receives an additional map from the smartphone 370.

The display unit 350 may mark and thereby display the location of the vehicle on the map stored in the storage 340 or the additional map that is received by the receiver 320.

According to an aspect, the storage 340 may update the stored map using the additional map received by the receiver 320.

According to an aspect, the display unit 350 may display an interface for receiving a search condition. The touch input unit 360 receives a touch input associated with the search condition from a user. The controller 330 generates the search condition by analyzing the touch input.

Here, the search condition may be a search condition for a route search including a start location and a destination location, or a search condition for a region search for a region including the calculated location of the vehicle.

The transmitter 310 transmits the generated search condition to the smartphone 370, and the receiver 320 receives a search result about the search condition. The search result may be displayed for the user using the display unit 350.

According to an aspect, the smartphone 370 may include a map for the entire area covered by a car navigation system, and may directly conduct a route search or a region search corresponding to the search condition.

According to another aspect, the smartphone 370 may transmit the search condition to a server 390 over a wireless communication network 380, and may receive the search result. In this example, the receiver 320 may receive again the search result from the smartphone 370.

According to an aspect, the receiver 320 may receive function lock setting data from the smartphone 370. Here, the function lock setting data may include information regarding a unique number of each screen constituting a user interface displayed on the display unit 350, a unique number of each of interface elements displayed on each screen, and activation or deactivation thereof. The display unit 350 may control a user interface to be activated or inactivated based on the function lock setting data.

Figure 4:
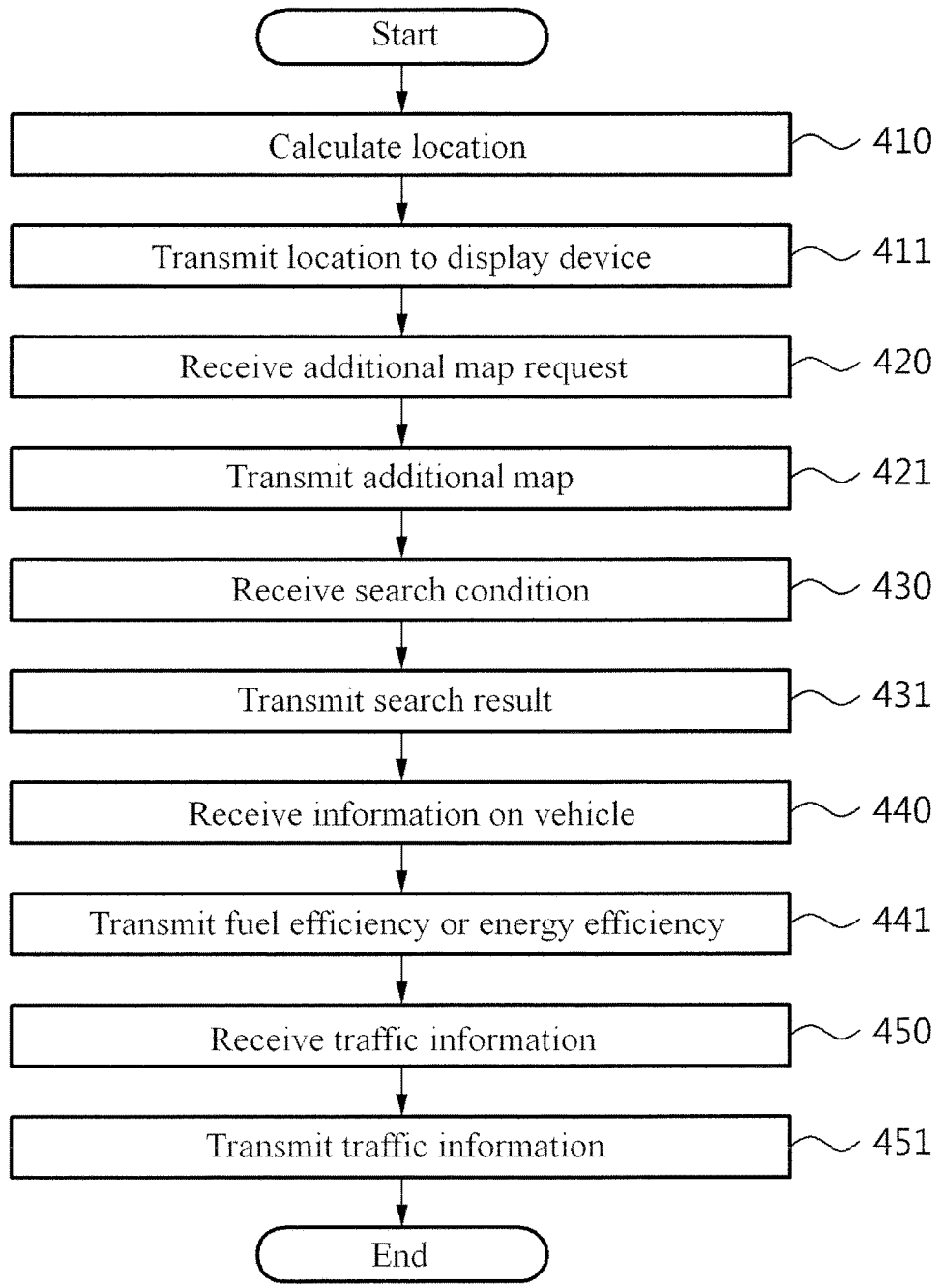
FIG. 4 is a flowchart illustrating an operation method of a smartphone according to an exemplary embodiment.

FIG. 4 is a flowchart illustrating an operation method of a smartphone according to an exemplary embodiment.

In operation 410, the smartphone calculates a location of the smartphone. The smartphone is equipped in a vehicle together with a display device and thus, the location of the smartphone may be construed being the same as a location of the display device and a location of the vehicle.

According to an aspect, the smartphone may receive a GPS signal and may calculate the location of the smartphone based on the GPS signal.

In operation 411, the smartphone transmits the location of the smartphone to the display device. According to an aspect, the transmitted location of the smartphone may be mapped on a map stored in the display device and thereby be displayed on the display device.

According to an aspect, instead of including a mass storage device configured to store a map of the entire area covered by a car navigation system, the display device may include only a small capacity buffer memory configured to display only a map of a small area enough to be displayed on a screen of the display device. In this example, when the vehicle moves and is deviated from an area of a map stored in the buffer memory, the display device may not map the location of the smartphone on the map.

In operation 420, the smartphone may receive, from the display device, an additional map request for requesting a map of a region not stored in the buffer memory of the display device.

According to an aspect, the smartphone may include a mass storage device configured to store a map of the entire area covered by a car navigation system. In this example, the smartphone may search the mass storage device for a map corresponding to the location of the smartphone and may transmit the found map to the display device in operation 421.

According to another aspect, the smartphone may transmit an additional map request to a server over a wireless communication network. In this example, the smartphone may receive a map corresponding to the location of the smartphone over the wireless communication network, and may transmit a map corresponding to the location of the smartphone to the display device in operation 421.

According to an aspect, the smartphone may communicate with the display device using at least one of communication methods such as Bluetooth, and USB.

Also, according to an aspect, the smartphone may communicate with the server using a WCDMA communication network and an communication network.

In operation 430, the smartphone may receive a search condition from the display device. Here, the search condition may be a search condition for a route search including a start location and a destination location, or a search condition for a region search for a region including the location of the smartphone.

In operation 431, the smartphone may conduct a search by transmitting, to a search server, the search condition received from the display device. In operation 431, the smartphone may transmit a search result to the display device.

In operation 440, the smartphone may receive, from the display device, information on the vehicle in which the smartphone is equipped. Here, information on the vehicle may include information on a model and a displacement of the corresponding vehicle.

In operation 441, the smartphone may calculate a fuel efficiency or an energy efficiency of the vehicle based on information on the vehicle. Also, the smartphone may transmit the calculated fuel efficiency or energy efficiency to the display device, and the calculated fuel efficiency or energy efficiency may be displayed on the display device.

In operation 450, the smartphone may receive traffic information corresponding to the calculated location of the smartphone from a traffic information providing server over the wireless communication network.

In operation 451, the smartphone may transmit the received traffic information to the display device. The transmitted traffic information may be displayed on the display device.

Figure 5:
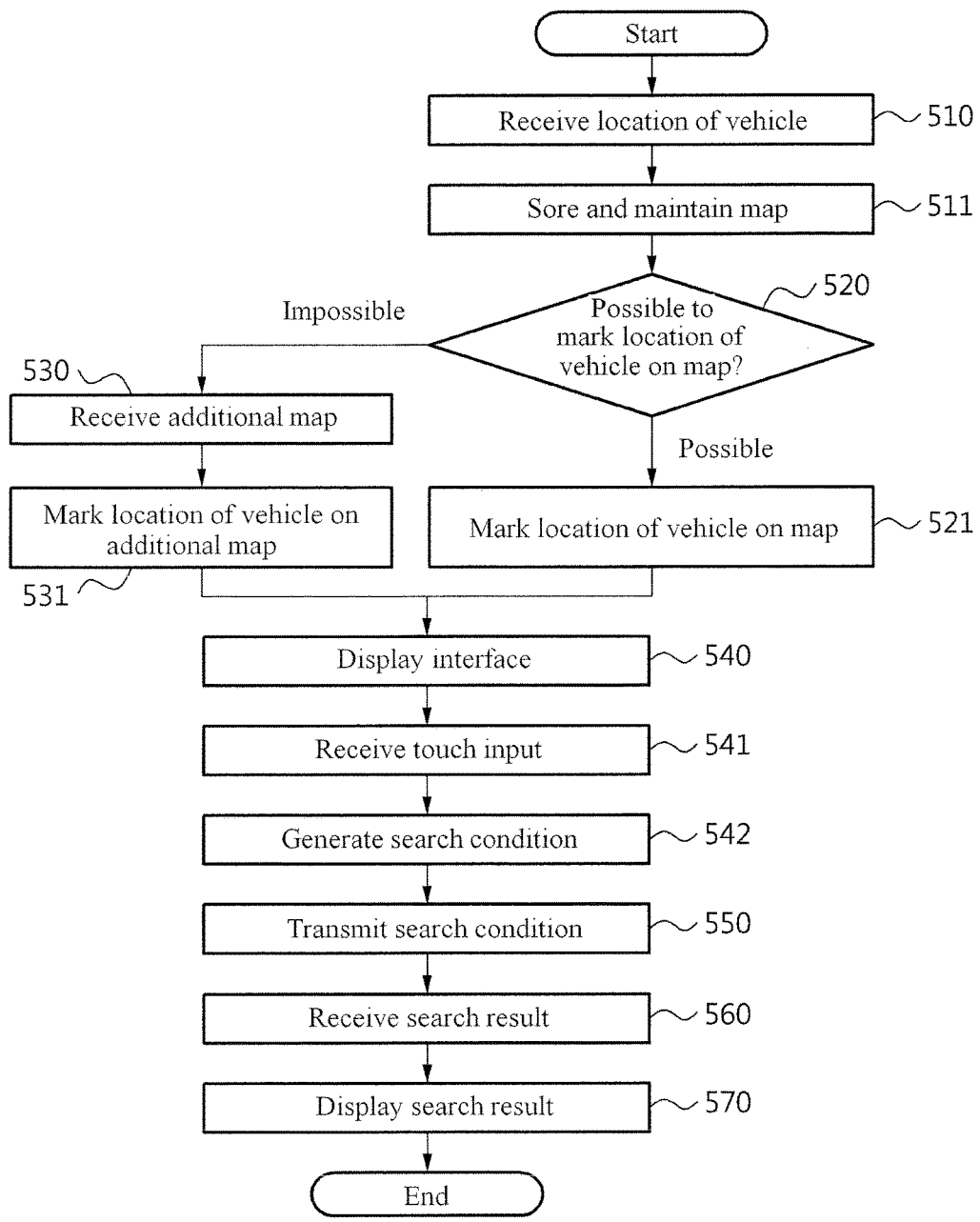
FIG. 5 is a flowchart illustrating an operation method of a display device according to an exemplary embodiment.

FIG. 5 is a flowchart illustrating an operation method of a display device according to an exemplary embodiment.

In operation 510, the display device receives, from a smartphone, a location of a vehicle in which the display device is equipped.

In operation 511, the display device stores a map. According to an aspect, instead of including a map of the entire area covered by a car navigation system, the display device may store only a map corresponding to a partial area in a buffer memory.

In operation 520, the display device determines whether the received location of the vehicle may be marked on the map stored in the buffer memory.

When it is determined that the location of the vehicle cannot be marked on the map stored in the buffer memory, the display device transmits, to the smartphone, an additional map request for requesting a map of a region corresponding to the location of the vehicle. In this example, in operation 530, in response to the additional map request, the display device receives an additional map from the smartphone. In operation 531, the display device may mark and thereby display the location of the vehicle on the received additional map.

Conversely, when it is determined that the location of the vehicle can be marked on the map stored in the buffer memory, the display device may map and thereby mark the location of the vehicle on the map stored in the buffer memory, in operation 521

In operation 540, the display device may display an interface for receiving a search condition.

In operation 541, the display device receives a touch input associated with the search condition from a user.

In operation 542, the display device generates the search condition by analyzing the touch input. Here, the search condition may be a search condition for a route search including a start location and a destination location of the vehicle, or a search condition for a region search for a region including the calculated location of the vehicle. Alternatively, the search condition may be a search condition for searching for traffic information associated with the location or a route of the vehicle.

In operation 550, the display device transmits the generated search condition to the smartphone. In operation 560, the display device receives a search result about the search condition. In operation 570, the display device may display the search result for the user.

Methods according to embodiments of the present invention may be configured in a program command form executable through a variety of computer devices and thereby be recorded in non-transitory computer-readable media. Examples of the non-transitory computer-readable media may include program commands, data files, and data structures alone or a combination thereof. Program commands stored in the media may be specially designed and configured for the invention, or may be known to those skilled in the art and thus, be available.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A detachable navigation system of a vehicle, the navigation system comprising a mobile device and a display device and equipped in the vehicle, wherein the display device is configured to provide a user interface for receiving information on a destination from a user and to transmit the information on the destination to the mobile device, wherein the mobile device is configured to receive the information on the destination from the display device, to calculate a current location of the mobile device as a current location of the vehicle, to calculate a route from the current location of the vehicle to the destination, and to transmit, to the display device, information on the current location of the vehicle and information on the route from the current location of the vehicle to the destination, wherein the mobile device comprises a mass storage memory configured to store a map of an entire area covered by a car navigation system, wherein the display device is configured to store, in a buffer memory, a map corresponding to a predetermined partial area among the entire area covered by the car navigation system, to receive information on the current location of the vehicle from the mobile device, and to display information on the current location of the vehicle on the map stored in the buffer memory of the display device, wherein the display device is configured to transmit an additional map request for requesting a map of an area, among the entire area, not stored in the buffer memory to the mobile device when the current location of the vehicle is deviated from an area of the map stored in the buffer memory, wherein the mobile device is configured to receive, from the display device, the additional map request for requesting the map of the area, among the entire area, not stored in the buffer memory and to transmit, to the display device, additional map data corresponding to the map of the area, among the entire area, not stored in the buffer memory and the deviated current location of the vehicle in response to receiving the additional map request, and wherein the display device is configured to receive, from the mobile device, the additional map data corresponding to the map of the area, among the entire area, not stored in the buffer memory and the deviated current location of the vehicle and to update the map stored in the buffer memory using that received additional map data wherein the display device comprises: a controller configured to determine whether the location of the vehicle is capable of being marked on the map stored in the buffer memory; a receiver configured to receive an additional map from the mobile device based on a result of the determining; and a display unit configured to mark and display the location of the vehicle on the additional map; and wherein the display device further comprises: a touch input unit, wherein the display unit is configured to display an interface for receiving a search condition, the touch input unit is configured to receive a touch input associated with the search condition from a user based on the interface, and the controller is configured to generate the search condition by analyzing the touch input.

2. The detachable navigation system of claim 1, wherein the mobile device calculates a location of the vehicle based on a global position system (GPS) signal.

3. The detachable navigation system of claim 1, wherein the mobile device comprises:
   a communication network connector configured to conduct a search by transmitting, to a search server, a search condition received from the display device; and
   a display communication unit configured to transmit a search result to the display device.

4. The detachable navigation system of claim 3, wherein the search condition is a search condition for a route search comprising a start location and a destination location or a search condition for a region search for a region comprising the calculated location of the mobile device.

5. The detachable navigation system of claim 1, wherein the mobile device comprises:
   a controller configured to calculate a fuel efficiency or an energy efficiency of the vehicle based on information on the vehicle that is received from the display device; and
   a display communication unit configured to transmit the fuel efficiency or the energy efficiency of the vehicle to the display device.

6. The detachable navigation system of claim 5, wherein the mobile device further comprises:
   a communication network connector configured to receive traffic information corresponding to the calculated location of the mobile device from a traffic information providing server over a wireless communication network,
   wherein the display communication unit is configured to transmit the received traffic information to the display device.

* * * * *